United States Patent
Liu et al.

(10) Patent No.: US 12,271,273 B1
(45) Date of Patent: Apr. 8, 2025

(54) MULTIPLE DISTRIBUTED PRIVATE REGISTRY MANAGEMENT

(71) Applicant: International Business Machines Corporation, Armonk, NY (US)

(72) Inventors: Guangya Liu, Cary, NC (US); Hai Hui Wang, Xian (CN); Peng Li, Xian (CN); Xiang Zhen Gan, Xian (CN); Ying Mo, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/482,139

(22) Filed: Oct. 6, 2023

(51) Int. Cl.
*G06F 3/00* (2006.01)
*G06F 11/14* (2006.01)

(52) U.S. Cl.
CPC ...... *G06F 11/1464* (2013.01); *G06F 11/1451* (2013.01); *G06F 11/1461* (2013.01); *G06F 2201/84* (2013.01)

(58) Field of Classification Search
CPC ......... G06F 16/178; G06F 2009/45562; G06F 2009/4557; G06F 2009/45575; G06F 9/45558; G06F 9/4856; G06F 9/5077; G06F 9/5088
See application file for complete search history.

(56) References Cited

U.S. PATENT DOCUMENTS

2022/0091874 A1  3/2022  Janakiram et al.

OTHER PUBLICATIONS

Gnutoolbox.com, Managing multiple private Docker registries, Sep. 14, 2018, https://www.gnutoolbox.com/managing-multiple-private-docker-registries/.
IBM Cloud, Setting up an image registry, May 9, 2023, https://cloud.ibm.com/docs/openshift?topic=openshift-registry.
Frog, Docker Hub and Docker Registries: A Beginner's Guide, Nov. 6, 2020, https://jfrog.com/devops-tools/article/docker-hub-and-docker-registries-a-beginners-guide/.
Dockerdocs, Registry as a pull through cache, 2023, https://docs.docker.com/registry/recipes/mirror/.
Ip.com, Distributed Image Registry, Nov. 7, 2022.
Dragonfly, What is Dragonfly?, 2023, https://d7y.io/docs/.

*Primary Examiner* — Yong J Choe
(74) *Attorney, Agent, or Firm* — Garg Law Firm, PLLC; Rakesh Garg; James Olsen

(57) ABSTRACT

An embodiment maps identifying information of a remote registry into a database within a local inventory at a local registry hub. An embodiment selects at least one remote registry from an index maintained in the local inventory in accordance with a policy received at a scheduler from an external client of the local registry hub. An embodiment selects a locally stored image in accordance with a policy received from an external client of the local registry hub. An embodiment uploads replicas of the selected image via one or more registry agents, each registry agent transmitting to its corresponding remote registry, transmitting constituent layers of the replica across multiple remote registries simultaneously such that a subset of the layers constituting the image are uploaded to each remote registry. An embodiment stores metadata for the uploaded image in a cache within a local metadata store.

20 Claims, 9 Drawing Sheets

MULTIPLE DISTRIBUTED PRIVATE REGISTRY MANAGEMENT

BACKGROUND

The present invention relates generally to management of image sharing among virtual machines. Specifically, the invention is directed toward the improved management of image sharing among remote registries as coordinated by a central registry hub in keeping with policy input the registry hub receives from remote clients.

Generally, virtual machines are computing environments implemented through software running on dedicated amount of hardware borrowed from a physical host computer. Virtual machines can run as a separate computing environment (e.g., when running a different operating system in a separate window) or serve as the user's complete computing environment (e.g., the interface experienced on many work computers). In either instance, the virtual machine is partitioned from the system and, thus, cannot interfere with the primary operating system of the host computer.

An image or snapshot is an instance of a virtual machine at a set point in time. A container is an instance of an image. An image can be likened to a digital photo while a container can be likened to a printout of the digital image. A registry consists of multiple repositories which contain images related to a specific project. Tags within each repository differentiate between versions of an image. Users or clients pull images, meaning to download them from a repository to use in development or push images, meaning to upload them to a repository to store in registries, or groups of repositories.

Registries, by acting as centralized sources for images, enable tighter version control and make it easier to manage and distribute images. Registries may be hosted in a cloud or on premises. Widely used registries include Docker™ (Docker is a trademark of Docker, Inc.), and Amazon's AWS™ (AWS is a trademark of Amazon.com, Inc. or its affiliates in the United States and other countries). A registry, including local registry hub, can be configured as a proxy cache. A proxy cache allows servers (e.g., the server(s) of the registry) and/or developers to pull images from a centralized location and uses upstream connections to upstream repositories (e.g., Docker Hub™) (Docker Hub is a trademark of Docker, Inc.), to ensure that the local copy of a given image is current. If the image is current, no pull request is made to the upstream repository, thus, the server/developer does not count against the upstream server's-rate limit. If the upstream image has been updated, it is pulled once to the local proxy cache and then delivered to the server/developer requesting it.

SUMMARY

The illustrative embodiments provide a method, system, and computer program product. An embodiment includes selecting, via a scheduler at the local registry hub, at least one remote registry from an index maintained in the local inventory in accordance with a policy received at the scheduler from an external client of the local registry hub. The embodiment further includes selecting, via the scheduler, a locally stored image in accordance with a policy received from an external client of the local registry hub. The embodiment further includes uploading replicas of the selected image via one or more registry agents, each registry agent transmitting to a corresponding remote registry, transmitting constituent layers of the replica across multiple remote registries simultaneously such that a subset of the layers constituting the image are uploaded to each remote registry. The embodiment further includes storing metadata for the uploaded image in a cache within a local metadata store.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

DETAILED DESCRIPTION

Figure 1:
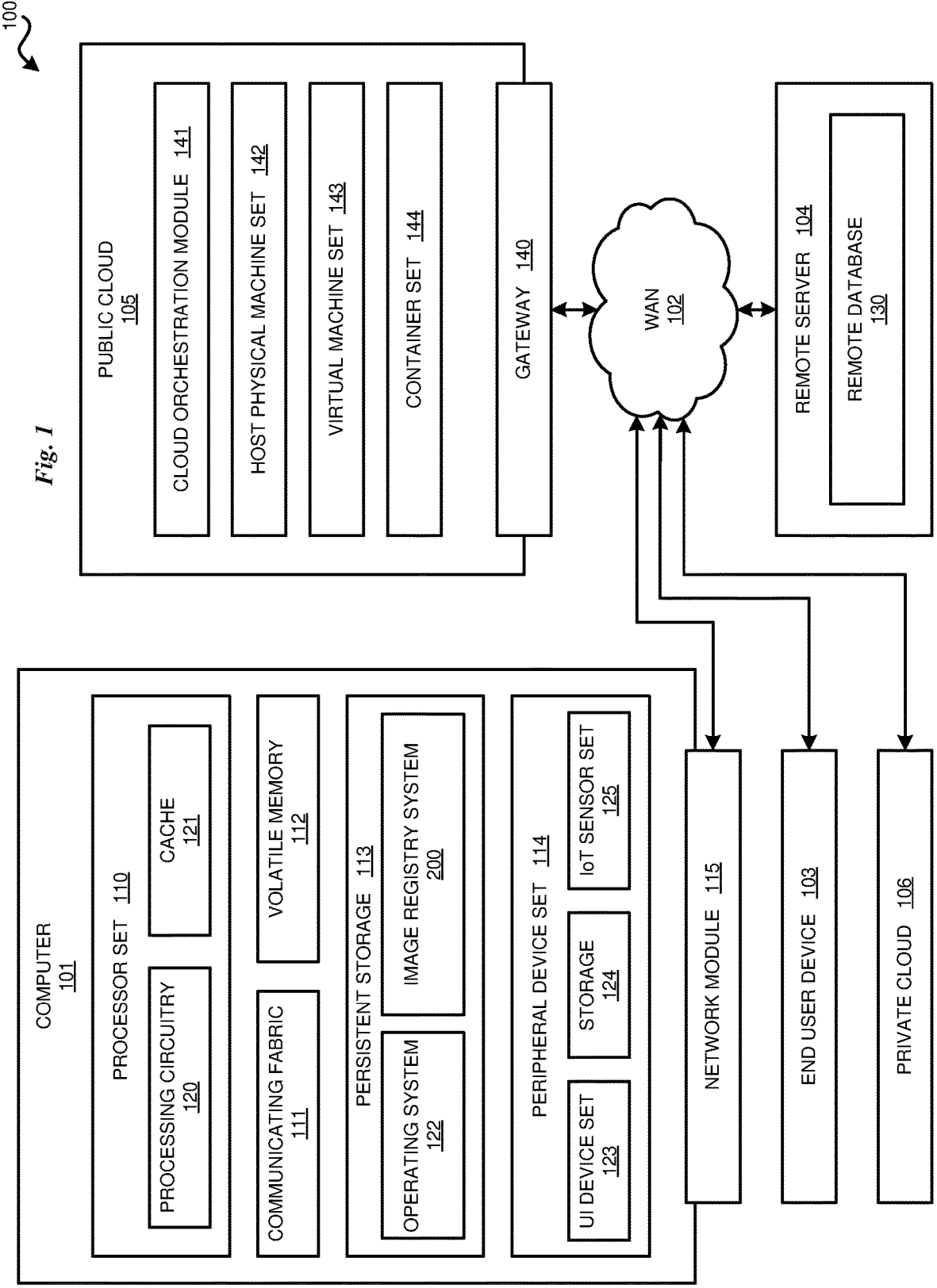
FIG. 1 depicts a block diagram of a computing environment in accordance with an illustrative embodiment.

The illustrative embodiments recognize that there is a need for improved operation of systems that manage image registries. Generally, such a system ceases pushing, that is uploading to a repository, or pulling, that is downloading from a repository, an image altogether if the backend storage or a registry server crashes. Moreover, even during optimal operation, such systems transmit an image layer-by-layer, serially, which makes pushing or pulling a large file relatively time-consuming. An image is essentially a set of instructions which essentially breaks down into layers. There is a need for a faster and more robust system for managing image registries, registries consisting of multiple repositories which contain images related to a specific project. The specific materials and techniques used to achieve this purpose may vary. The components and arrangements described herein are merely examples. They are not intended to be limiting.

In a typical image registry management system, an image is pulled from or pushed to a cloud-based hub as needed. Any interruption in the operation of the cloud-based hub halts image sharing. Even when traditional image registry management systems operate correctly, they transmit images one layer at a time in serial. This results in relatively slow pushing and pulling of a large image when using traditional systems.

As will be shown below, preferred embodiments improve speed and reliability in a number of ways. In lieu of a cloud-based registry, preferred embodiments instead use a locally implemented registry hub. The local registry hub pushes multiple replicas of images to remote registries, resulting in High Availability (HA). Additionally, the local registry hub facilitates faster future operations. When images are pushed to remote registries, both a layer index and an image distribution policy indicate where images layers persist in respective remote registries persist locally.

Additionally, while traditional image registry management systems store one image per registry and transmit images serially, preferred embodiments store layers of a given image across multiple registries and transmit the plurality of separately stored layers simultaneously. The result is greatly improved image transmission.

Illustrative embodiments include establishing a knowledge base based at least in part on sensor data received from a network. The knowledge base comprises network data representative of a plurality of entities in the network and relationships among the plurality of entities in the network. An entity as referred to herein is any network component of interest represented as a node in the knowledge graph and will generally be a source of data or described by another source of data.

Illustrative embodiments include generating a predicted performance parameter for a designated entity from the plurality of entities using a first machine learning algorithm. In some embodiments, the first machine learning algorithm is a graph neural network. The graph neural network (GNN) is applicable mainly to non-Euclidean spatial data. Because the knowledge graph is a kind of graph data, the preset disclosure recognizes that a combination of the GNN and the knowledge graph can be used to solve knowledge graph-related problems. For example, the GNN-based approach can adequately capture information on complex and hidden patterns in ternary neighborhoods. It can also achieve the relational complementation of the knowledge graph, in contrast with knowledge-based reasoning that uses individual ternary relationships.

Illustrative embodiments also include comparing predicted performance parameter to an actual performance parameter for all or a portion of the network. Such embodiments may also determine that the actual performance parameter exceeds a threshold difference from the predicted performance parameter. The threshold difference may be adjustable as a user setting, for example depending on the application and desired level of detail and precision.

Illustrative embodiments respond to determining that the actual performance parameter exceeds the threshold value by generating incentive data using a second machine learning algorithm. In some embodiments, the second machine learning algorithm is a reinforcement learning algorithm. In some such embodiments, the incentive data is representative of an action selected by the second machine learning algorithm using an iterative optimization process, and the iterative optimization process comprises performing the action and determining that the actual performance parameter approaches the threshold value in response to the action. The embodiment also includes that the incentive data is representative of an action selected by the second machine learning algorithm using an iterative optimization process, and that the iterative optimization process comprises performing the action and determining that the actual performance parameter approaches the threshold value in response to the action.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefore, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference to FIG. 1, this figure depicts a block diagram of a computing environment 100. Computing environment 100 contains an example of an environment for the execution of at least some of the computer code involved in performing the inventive methods, such as the image registry system 200 configured for improved image sharing among virtual machines through central management of remote registries via a central hub acting as a proxy in accordance with an illustrative embodiment described herein. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

Figure 2:
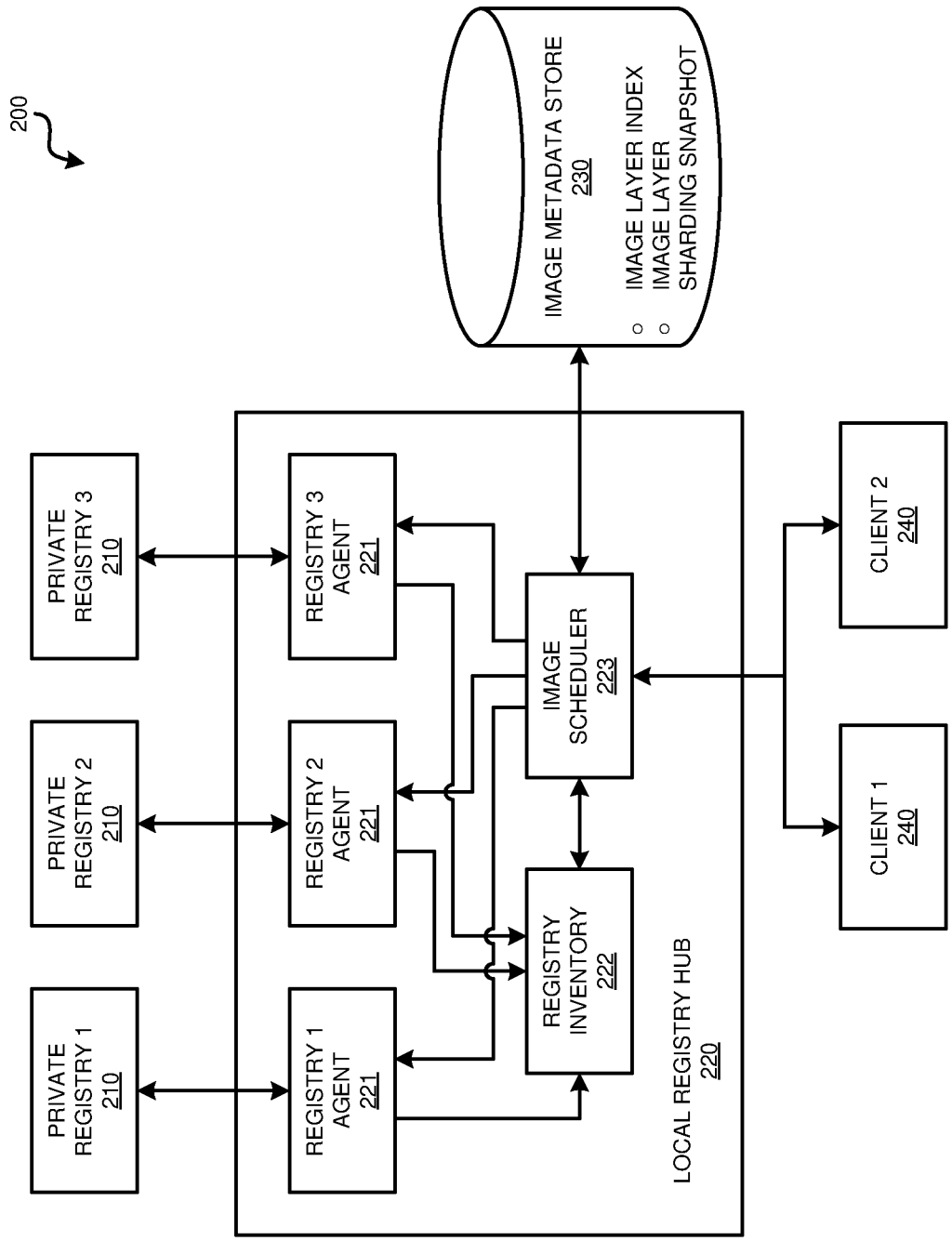
FIG. 2 depicts a block diagram that illustrates a preferred system architecture for distributed registry management according to an illustrative embodiment.

With reference to FIG. 2, this figure depicts a block diagram of an example image registry system 200 for distributed registration management. The system architecture includes a local registry hub 220 which houses registry agents 221, a registry inventory 222, and an image scheduler 223. The local registry hub is communicatively coupled to an image metadata store 230, private registries 210, and clients 240. The local registry hub acts as a proxy, pushing images to and pulling images from private registries 210. When the local registry hub decides to push an image to a remote registry 210 or pull an image from a remote registry 210, the image scheduler 223 determines which remote registry 210 to pull from or push to. The image scheduler 223 receives input including potential image distribution policy from clients 240. The registry inventory 222 registers private registries as they report. The registry agents 221 are mapping agents deployed to the local registry hub. The registry agents 221 also collects metrics for local private registries. The registry agents 221 also monitor scheduler decisions regarding decisions made by image scheduler 223 regarding which private registries 210 to push images to or pull images from.

The image metadata store 230 is a relational database that utilizes sharding. In a relational database, logical data structures (e.g., the data tables, views, and indexes) are separate from the physical storage structures. Sharding involves storing partitions of data across multiple servers. Relevant logical data structures in this case include an image layer index and an image layer sharding snapshot. An index is a list in which each entry contains the name of an item and its location. An image layer index shows, for a given image, its constituent layers. An image layer sharding snapshot captures the policy followed to push an image as it documents not only the constituent layers of a given image, but where each layer is stored after the image is pushed. When an image is pushed the metadata store 230 persists an image layer index and an image layer sharding snapshot (an image distribution policy) for the image by storing them in a local cache. In preferred embodiments, an image is pushed such that its layers are stored at distributed servers. Specifically, the layers of a pushed image will be divided among a number of private registries 210. The persisted data informs future image pulls.

Figure 3:
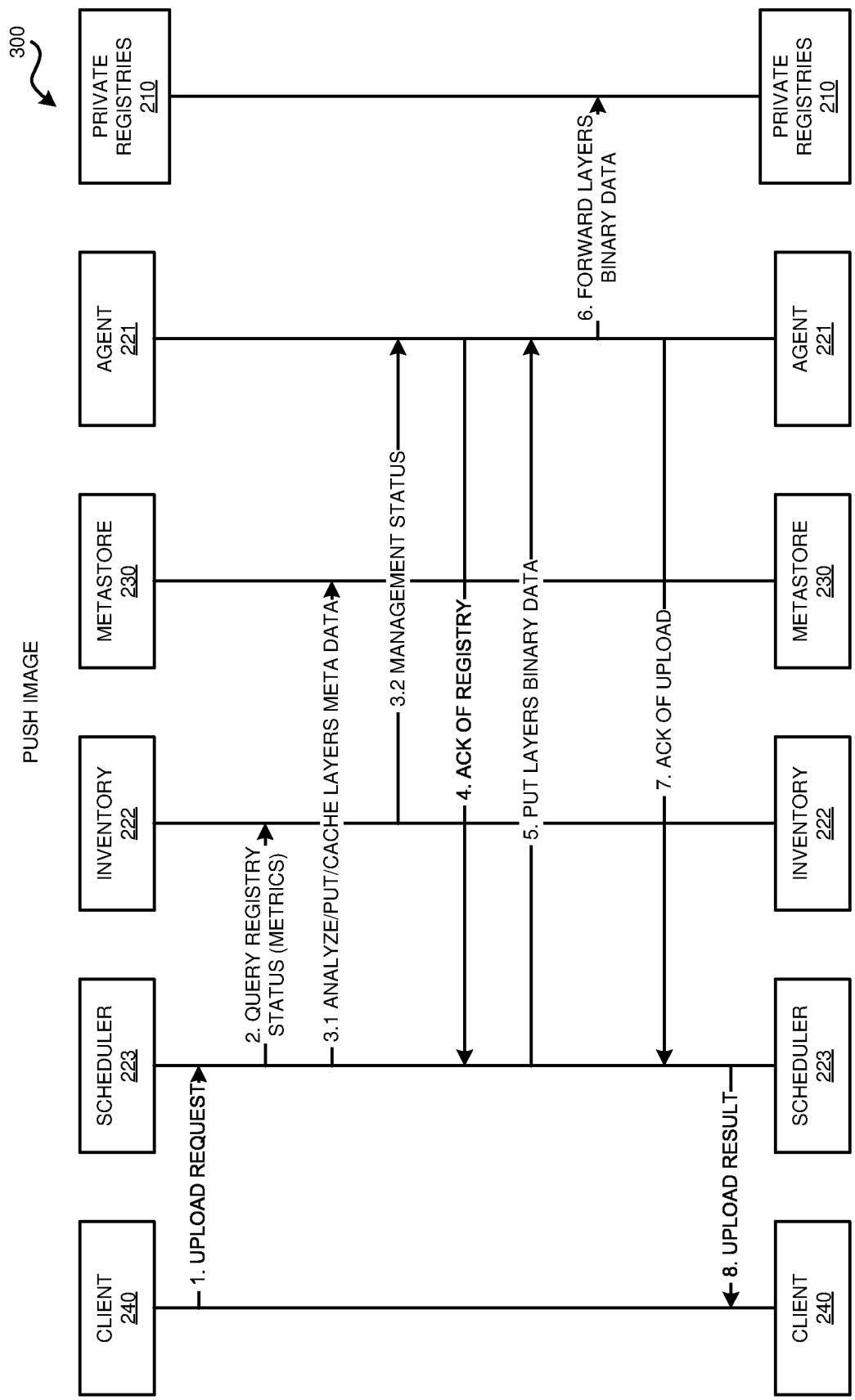
FIG. 3 depicts a sequence diagram illustrating the pushing of an image to a remote registry according to an illustrative embodiment.
Figure 4:
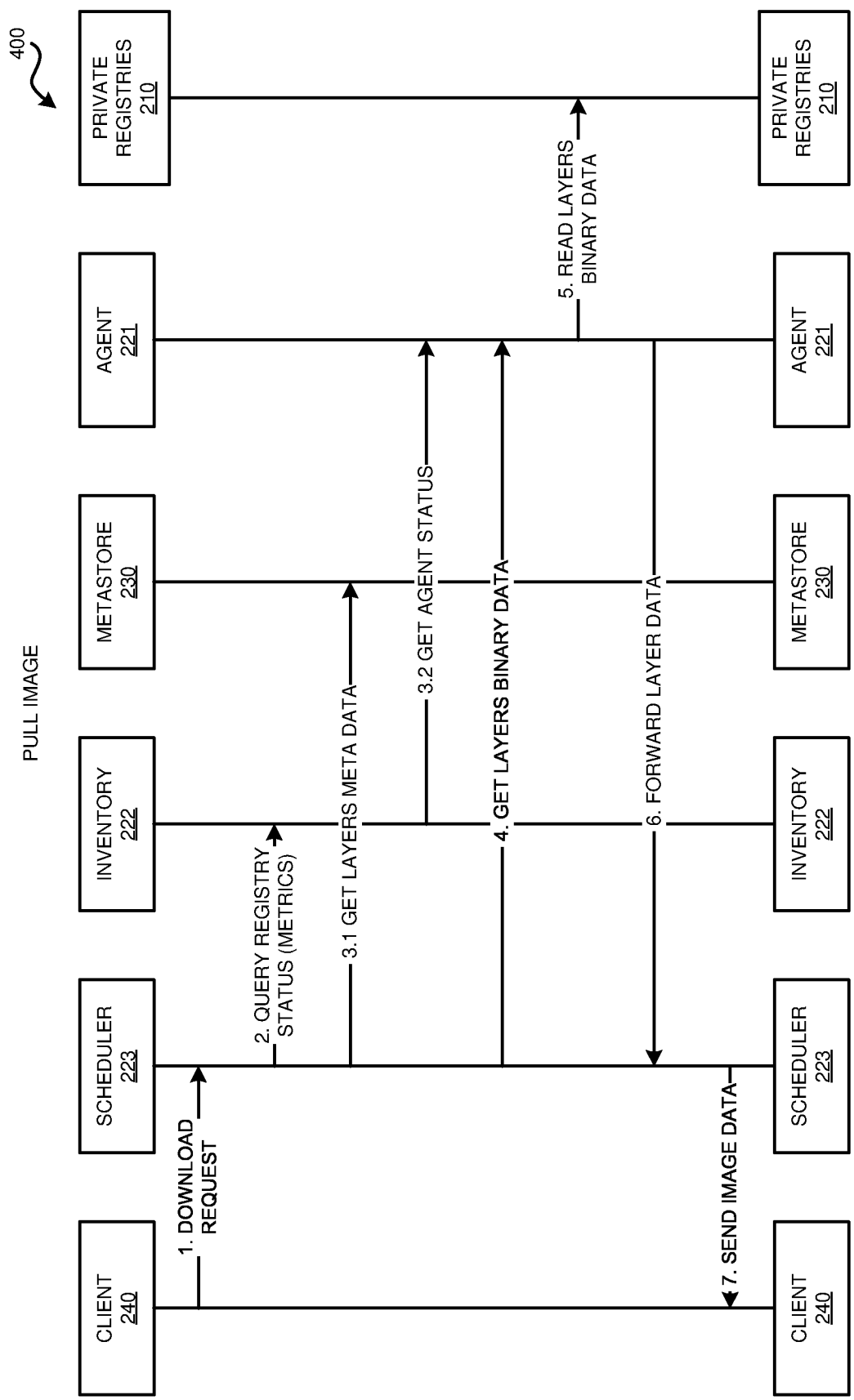
FIG. 4 depicts a sequence diagram illustrating the pulling of an image from a remote registry according to an illustrative embodiment.

With reference to FIGS. 3 and 4, these figures depict sequence diagrams illustrating the pushing of an image to a remote registry or the pulling of an image from a remote registry according to an embodiment of the present invention. In a representative push sequence as shown in FIG. 3 the actions may take a number of substantially similar orders as required to carry out the push request, including but not limited to the order below.

Step 1—The scheduler 223 receives an upload request from a client 240

Step 2—The scheduler 223 submits a registry status query to the inventory 222

Step 3.1—The scheduler 223 prompts the metastore to analyze, manipulate, and/or cache layer metadata Step 3.2—The inventory 222 prompts the agent 221 for management status Step 4—The agent 221 sends the scheduler 223 acknowledgement of registry Step 5—The scheduler 223 prompts the agent 221 to PUT layers of binary data Step 6—The agent 221 forwards layers of binary data to the private registry 210

Step 7—The agent 221 sends acknowledgement to the scheduler 223

Step 8—The scheduler 221 sends and upload result to the client 240

Similarly, regarding FIG. 4 the actions may take a number of substantially similar orders as required to carry out the pull request, including but not limited to the order below.

Step 1—The scheduler 223 receives a download request from a client 240

Step 2—The scheduler 223 submits a registry status query to the inventory 222

Step 3.1—The scheduler 223 prompts the metastore 230 for layer metadata

Step 3.2—The inventory 222 prompts the agent 221 for agent status

Step 4—The scheduler 223 prompts the agent 221 for layers of binary data Step 5—The agent 221 prompts the private registries 210 to read binary layers of data Step 6—The agent 221 forwards layers of data to the scheduler 223

Step 7—The scheduler 223 sends image data to the client 240

The steps shown in FIGS. 3 and 4 do not constitute all steps that would successfully acknowledge the attempted actions or the only order in which such steps can accomplish the attempted actions. From these non-limiting depictions, those of ordinary skill in the art will be able to construct other interactions towards a similar purpose, other orders of interactions towards a similar purpose, or add or modify a described example structure of an example interaction differently from the example. Such differences and alternatives are contemplated within the scope of the illustrative embodiments.

Figure 5:
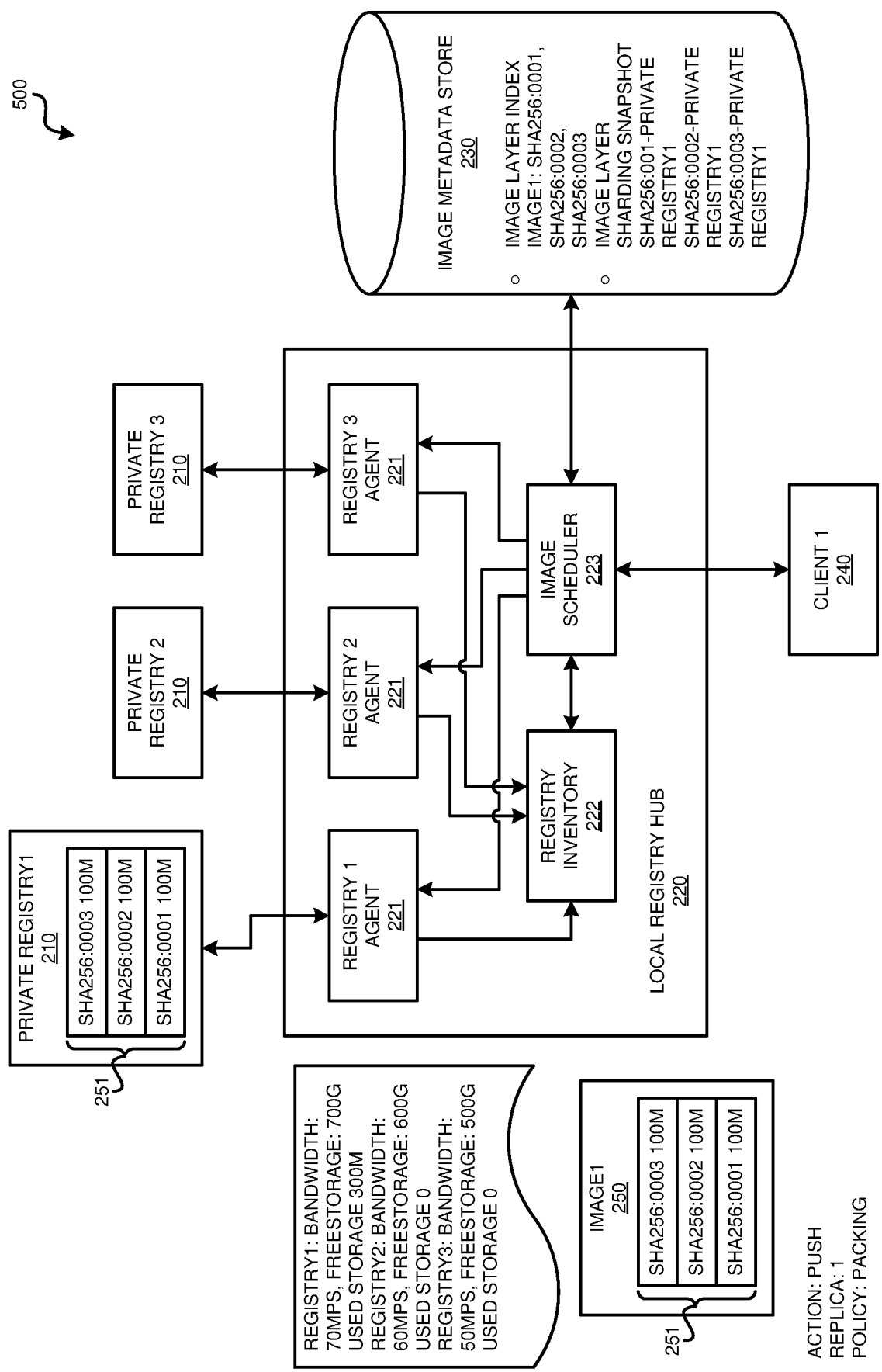
FIG. 5 depicts a block diagram that illustrates an image push sequence utilizing preferred system architecture for distributed registry management according to an embodiment of the present invention.

With reference to FIGS. 5, these figures depict block diagram that illustrate an image push sequence utilizing example system architecture for distributed registry management according to an embodiment of the present invention. As in FIGS. 3 and 4, image movement is shown. However, the movement shown here is more clearly granular. FIG. 5 illustrates the process of pushing images in the image registry system 200. FIG. 5 depicts packing, transmitting an image to or from a single registry. Note that replicas of all layers 251 of the image 250 are transmitted during operation to a single registry 210, Registry 1. The image metadata store 230 documents this, persisting the image layer index, which identifies the image to be replicated and pushed as well as its constituent layers, and the image layer sharding snapshot, which associates each constituent layer with the remote registry 210 to which it was pushed.

Figure 6:
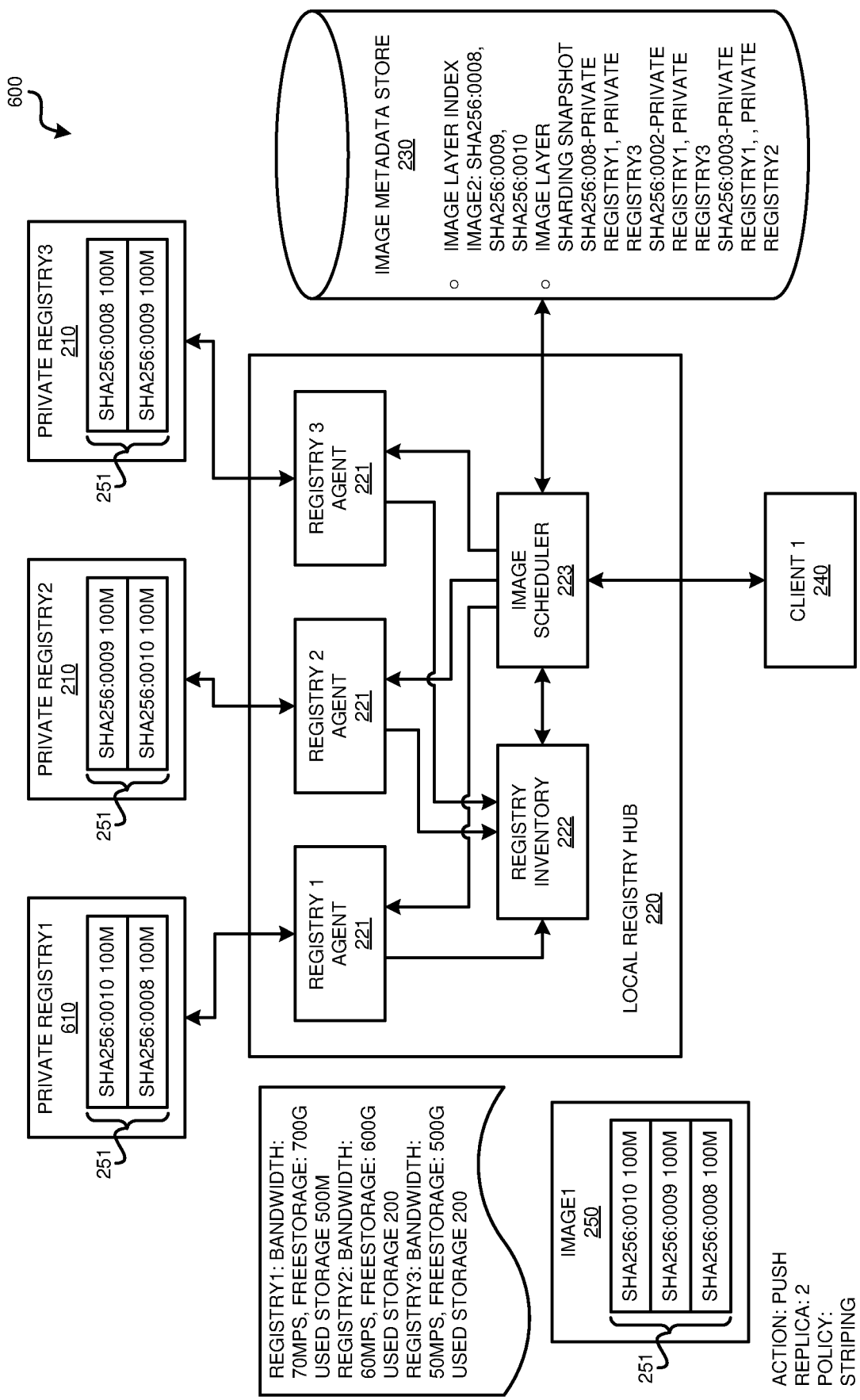
FIG. 6 depicts a block diagram that illustrates another image push sequence utilizing preferred system architecture for distributed registry management according to an illustrative embodiment.

With reference to FIG. 6, this figure depicts a block diagram that illustrates an image push sequence utilizing example system architecture for distributed registry management according to an embodiment of the present invention. Like FIG. 5, FIG. 6 illustrates the process of pushing images in the image registry system 200. However, FIG. 6 depicts striping and transmitting an image to multiple registries. The replicas of layers 251 of the image 250 in FIG. 6 are split among all three private registries 251. The image metadata store 230 captures the information about the movement of the replicas by persisting the image layer index, which identifies the image to be replicated and pushed as well as its constituent layers, and the image layer sharding snapshot, which associates each constituent layer with the remote registry 210 to which it was pushed. the applicable layer indexes and image layer sharding snapshots.

Figure 7:
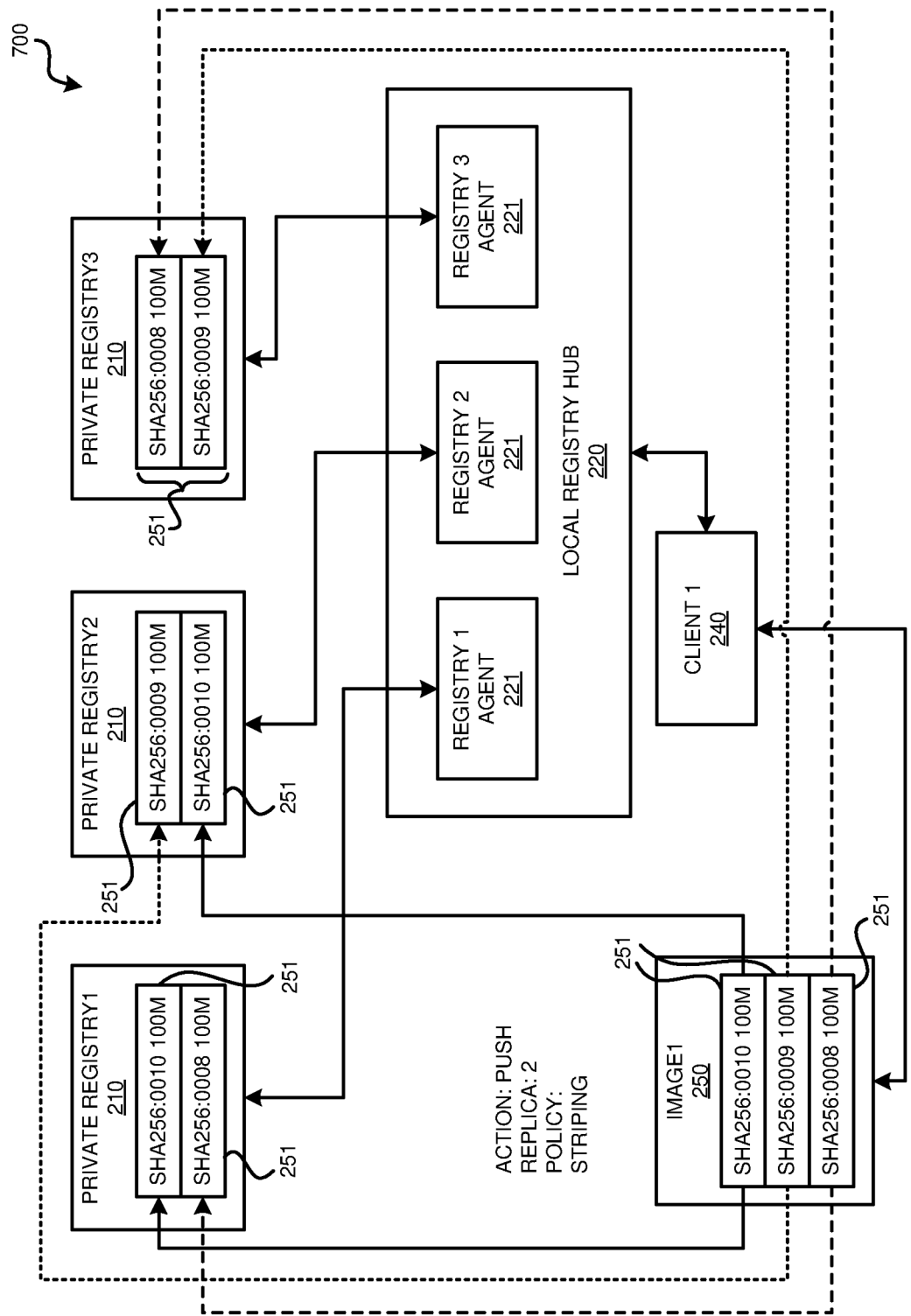
FIG. 7 depicts a block diagram that illustrates improved transmission of images during a push sequence according to an illustrative embodiment.

With reference to FIG. 7, this figure depicts a block diagram that illustrates improved transmission of images during a push sequence according to embodiments of the present invention. FIG. 7 shows two replicas being pushed into a plurality of private registries 210, resulting in high efficiency (HA), or the availability of multiple instances at the upload location for future pulling. Moreover, when an image replica is uploaded, each of its constituent layers is transmitted in parallel, that is simultaneously, so that the image is uploaded as quickly as possible.

Figure 8:
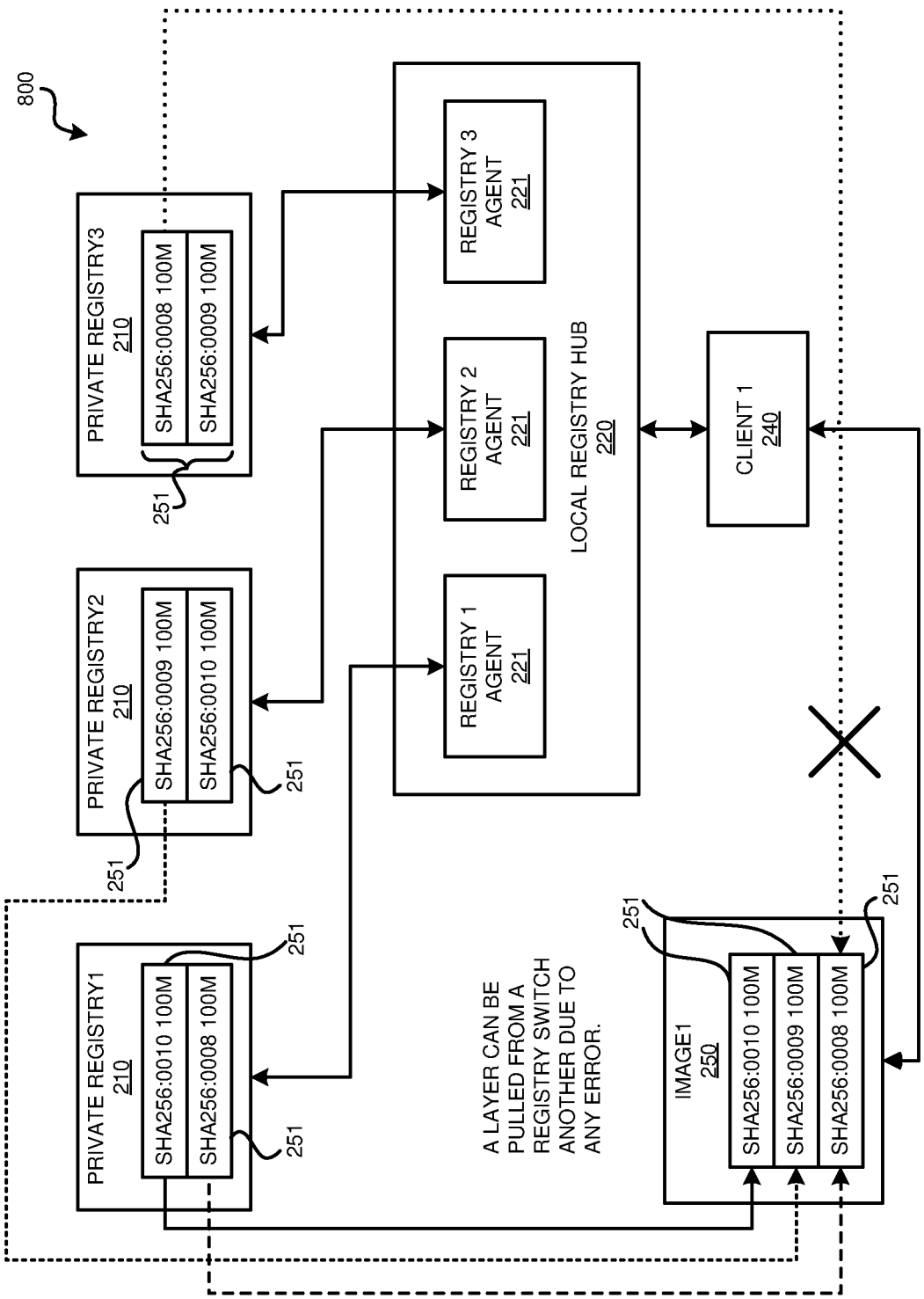
FIG. 8 depicts a block a block diagram that illustrates improved transmission of images during a pull sequence according to an embodiment of the present invention.

With reference to FIG. 8, this figure depicts a block diagram that illustrates improved transmission of images during a pull sequence according to embodiments of the present invention. FIG. 8 depicts a pulling sequence that could follow the push sequence depicted in FIG. 7. Like FIG. 7, FIG. 8 depicts transmitting image layers simultaneously, which results in improved transmission time. FIG. 8 demonstrates the utility of pushing replicas into a plurality of private registries 210, or HA. Specifically, when the first attempt at pulling a replica from Registry 3 failed due to a technical problem, a second attempt to pull another instance of the replica from Registry 1 succeeded.

Figure 9:
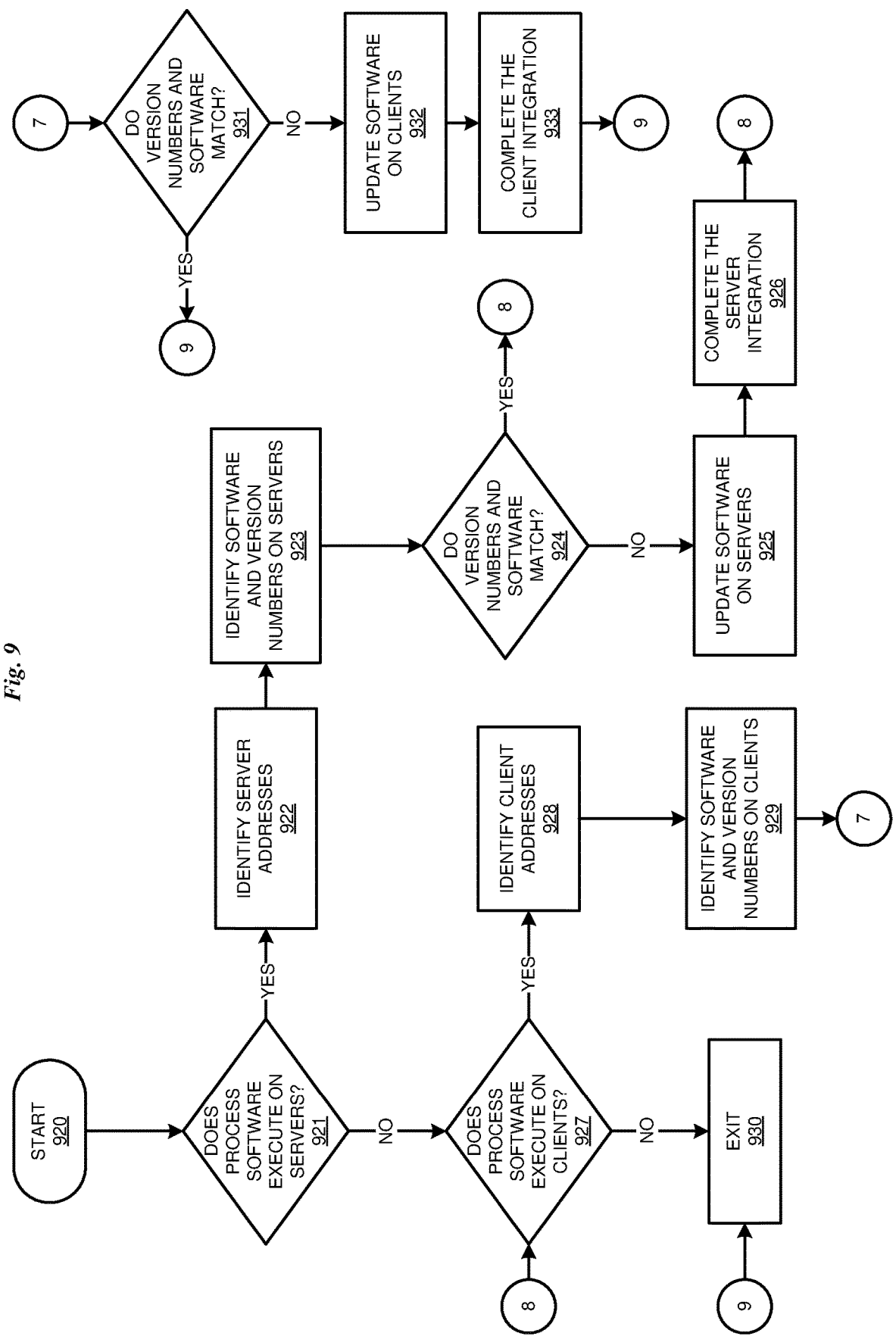
FIG. 9 depicts a block diagram of the implementation of an illustrative embodiment by leveraging integration service type software.

Regarding FIG. 9, the integration process identifies any software on the clients and servers, including the network operating system where the process software will be deployed, that are required by the process software or that work in conjunction with the process software. This includes software in the network operating system that enhances a basic operating system by adding networking features. The software applications and version numbers will be identified and compared to the list of software applications and version numbers that have been tested to work with the process software. Those software applications that are missing or that do not match the correct version will be updated with those having the correct version numbers. Program instructions that pass parameters from the process software to the software applications will be checked to ensure the parameter lists match the parameter lists required by the process software. Conversely, parameters passed by the software applications to the process software will be checked to ensure the parameters match the parameters required by the process software. The client and server operating systems, including the network operating systems, will be identified and compared to the list of operating systems, version numbers and network software that have been tested to work with the process software. Those operating systems, version numbers and network software that do not match the list of tested operating systems and version numbers will be updated on the clients and servers in order to reach the required level.

After ensuring that the software, where the process software is to be deployed, is at the correct version level that has been tested to work with the process software, the integration is completed by installing the process software on the clients and servers.

Step 920 begins the integration of the process software. An initial step is to determine if there are any process software programs that will execute on a server or servers (921). If this is not the case, then integration proceeds to 927. If this is the case, then the server addresses are identified (922). The servers are checked to see if they contain software that includes the operating system (OS), applications, and network operating systems (NOS), together with their version numbers that have been tested with the process software (923). The servers are also checked to determine if there is any missing software that is required by the process software (923).

A determination is made if the version numbers match the version numbers of OS, applications, and NOS that have been tested with the process software (924). If all of the versions match and there is no missing required software, the integration continues (927).

If one or more of the version numbers do not match, then the unmatched versions are updated on the server or servers with the correct versions (925). Additionally, if there is missing required software, then it is updated on the server or servers (925). The server integration is completed by installing the process software (926).

Step 927 (which follows 921, 924 or 926) determines if there are any programs of the process software that will execute on the clients. If no process software programs execute on the clients, the integration proceeds to 930 and exits. If this is not the case, then the client addresses are identified (928).

The clients are checked to see if they contain software that includes the operating system (OS), applications, and network operating systems (NOS), together with their version numbers that have been tested with the process software (929). The clients are also checked to determine if there is any missing software that is required by the process software (929).

A determination is made if the version numbers match the version numbers of OS, applications, and NOS that have been tested with the process software (931). If all of the versions match and there is no missing required software, then the integration proceeds to 930 and exits.

If one or more of the version numbers do not match, then the unmatched versions are updated on the clients with the correct versions 932. In addition, if there is missing required software, then it is updated on clients 932. The client integration is completed by installing the process software on clients 933. The integration proceeds to 930 and exits.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer implemented method implemented via at least one processor, the method comprising:
   mapping, via one or more registry agents, a web address and identifying information of a corresponding remote registry into a database within a local inventory at a local registry hub;
   selecting, via a scheduler at the local registry hub, at least one remote registry from an index maintained in the local inventory in accordance with a policy received at the scheduler from an external client of the local registry hub;
   selecting, via the scheduler, a locally stored image in accordance with the policy received from the external client of the local registry hub;
   uploading one or more replicas of the selected image via one or more registry agents, each registry agent transmitting to a corresponding remote registry, transmitting constituent layers of the replica across multiple remote registries simultaneously such that a subset of the layers constituting the image is uploaded to each remote registry; and
   storing metadata for the uploaded image in a cache within a local metadata store.

2. The method of claim 1, wherein replicas of multiple locally stored images are uploaded to one or more remote registries.

3. The method of claim 1, wherein each registry agent is deployed to the local registry hub on behalf of a remote registry and is operable to collect metrics for a respective remote registry.

4. The method of claim 1, wherein the metadata stored for the uploaded image includes an image layer index and an image layer sharding snapshot.

5. The method of claim 3, wherein the metrics collected by each registry agent include a record of a number of times over a predetermined period a corresponding remote registry was selected by the scheduler.

6. The method of claim 4, further comprising:
   selecting, via the scheduler at the local registry hub, an image layer index and an associated image layer sharding snapshot from metadata stored for uploaded images within the local metadata store in accordance with the policy received from the external client of the local registry hub; and
   downloading, to the local registry hub, a replica of the image identified in the selected metadata, via one or more registry agents, each registry agent transmitting from a corresponding remote registry constituent layers of the replica simultaneously.

7. The method of claim 6, further comprising:
   responsive to a failure at a remote registry preventing the local registry hub from downloading a layer of the replica, downloading another instance of the layer of the replica from another remote registry.

8. A computer program product comprising one or more computer readable storage media, and program instructions collectively stored on the one or more computer readable storage media, the program instructions executable by a processor to cause the processor to perform operations comprising:
   program instructions to map, via one or more registry agents, a web address and identifying information of a corresponding remote registry into a database within a local inventory at a local registry hub;
   program instructions to select, via a scheduler at the local registry hub, at least one remote registry from an index maintained in the local inventory in accordance with a policy received at the scheduler from an external client of the local registry hub;
   program instructions to select, via the scheduler, a locally stored image in accordance with the policy received from the external client of the local registry hub;
   program instructions to upload replicas of the selected image via one or more registry agents, each registry agent transmitting to a corresponding remote registry, transmitting constituent layers of each replica across multiple remote registries simultaneously such that a subset of the layers constituting the image are uploaded to each remote registry; and
   program instructions to store metadata for the uploaded image in a cache within a local metadata store.

9. The computer program product of claim 8, wherein replicas of multiple locally stored images are uploaded to one or more remote registries.

10. The computer program product of claim 8, wherein metadata stored for the uploaded image includes an image layer index and an image layer sharding snapshot.

11. The computer program product of claim 8, wherein the stored program instructions are stored in a computer readable storage device in a data processing system, and wherein the stored program instructions are transferred over a network from a remote data processing system.

12. The computer program product of claim 8, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:
    program instructions to meter use of the program instructions associated with the request; and
    program instructions to generate an invoice based on the metered use.

13. The computer program product of claim 8, wherein each registry agent is deployed to the local registry hub on behalf of a remote registry and is operable to collect metrics for a respective remote registry.

14. The computer program product of claim 8, further comprising:
    program instructions to select, via the scheduler at the local registry hub, an image layer index and an associated image layer sharding snapshot from metadata stored for uploaded images within the local metadata store, in accordance with the policy received from the external client of the local registry hub; and
    program instructions to download to the local registry hub a replica of the image identified in the selected metadata, via one or more registry agents, each registry agent transmitting from a corresponding remote registry constituent layers of the replica simultaneously.

15. The computer program product of claim 8, further comprising:
    program instructions to download, responsive to a failure at a remote registry preventing the local registry hub from downloading a layer of the replica from a remote registry, another instance of the layer of the replica from another remote registry.

16. The computer program product of claim 13, wherein the metrics collected by each registry agent include a record of a number of times over a predetermined period a corresponding remote registry was selected by the scheduler.

17. A local registry hub, implemented via one or more processors and one or more computer readable storage media, operable to perform distributed management of image registries by acting as a proxy to push and pull images from a plurality of remote registries, the hub comprising at least:
- one or more registry agents operable to map a web address and identifying information of a corresponding remote registry into a database within a local inventory at a local registry hub;

a scheduler at the local registry hub, operable to:
- select at least one remote registry from an index maintained in the local inventory in accordance with a policy received at the scheduler from an external client of the local registry hub, and
- select a locally stored image in accordance with the policy received from the external client of the local registry hub;
- one or more registry agents operable to upload replicas of the selected image, each registry agent transmitting to a corresponding remote registry, transmitting constituent layers of the replica across multiple remote registries simultaneously such that a subset of the layers constituting the image are uploaded to each remote registry; and
- a cache within a local metadata store operable to store metadata for the uploaded image.

18. The local registry hub of claim 17, wherein the metadata stored for the uploaded image includes an image layer index and an image layer sharding snapshot.

19. The local registry hub of claim 17, wherein, the scheduler is further operable to select an image layer index and an associated image layer sharding snapshot from metadata stored for uploaded images within the local metadata store, in accordance with the policy received from the external client of the local registry hub; and
- one or more registry agents are further operable to download to the local registry hub a replica of the image identified in the selected metadata, each registry agent transmitting from a corresponding remote registry constituent layers of the replica simultaneously.

20. The local registry hub of claim 17, wherein when a failure at a remote registry prevents the local registry hub from downloading a layer of a replica from a remote registry, the remote agents are operable to download another instance of the layer of the replica from another remote registry.

* * * * *